United States Patent
Younes et al.

(10) Patent No.: US 8,589,366 B1
(45) Date of Patent: Nov. 19, 2013

(54) DATA EXTRACTION USING TEMPLATES

(75) Inventors: Haakan Younes, Pittsburgh, PA (US); Charles F. Schafer, III, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 676 days.

(21) Appl. No.: 11/933,962

(22) Filed: Nov. 1, 2007

(51) Int. Cl.
*G06F 7/00* (2006.01)
*G06F 17/30* (2006.01)

(52) U.S. Cl.
USPC .......................... 707/705; 707/602; 707/797

(58) Field of Classification Search
USPC ........................................ 707/101, 602, 705
See application file for complete search history.

(56) References Cited

U.S. PATENT DOCUMENTS

| | | | |
|---|---|---|---|
| 6,920,609 B1 * | 7/2005 | Manber et al. ................ | 715/205 |
| 7,246,306 B2 * | 7/2007 | Chen et al. .................... | 715/205 |
| 7,555,480 B2 * | 6/2009 | Zhang et al. ........................... | 1/1 |
| 7,584,194 B2 * | 9/2009 | Tuttle et al. ...................... | 707/10 |
| 7,693,804 B2 * | 4/2010 | Tung .............................. | 706/15 |
| 8,010,544 B2 * | 8/2011 | Tiyyagura .................... | 707/758 |
| 2002/0143659 A1 * | 10/2002 | Keezer et al. .................... | 705/27 |
| 2003/0005159 A1 * | 1/2003 | Kumhyr ........................ | 709/246 |
| 2003/0095135 A1 * | 5/2003 | Kaasila et al. ................ | 345/613 |
| 2003/0101203 A1 * | 5/2003 | Chen et al. .................... | 707/513 |
| 2005/0039117 A1 * | 2/2005 | Lwo ............................... | 715/513 |
| 2006/0242180 A1 * | 10/2006 | Graf et al. ...................... | 707/101 |
| 2007/0299869 A1 * | 12/2007 | Clary et al. ................. | 707/104.1 |
| 2008/0016087 A1 * | 1/2008 | Zhang et al. .................. | 707/100 |
| 2008/0046441 A1 * | 2/2008 | Wen et al. ...................... | 707/100 |
| 2008/0098300 A1 * | 4/2008 | Corrales et al. .............. | 715/243 |
| 2008/0114800 A1 * | 5/2008 | Gazen et al. ................... | 707/101 |
| 2008/0168135 A1 * | 7/2008 | Redlich et al. ................ | 709/204 |
| 2008/0281796 A1 * | 11/2008 | Prager et al. ....................... | 707/3 |
| 2008/0281827 A1 * | 11/2008 | Wang et al. ..................... | 707/10 |
| 2009/0019353 A1 * | 1/2009 | Abrams et al. ................ | 715/224 |
| 2009/0044106 A1 * | 2/2009 | Berkner et al. ............... | 715/273 |
| 2009/0063500 A1 * | 3/2009 | Zhai et al. ........................ | 707/10 |
| 2009/0216758 A1 * | 8/2009 | Tuttle et al. ........................ | 707/5 |
| 2010/0179876 A1 * | 7/2010 | Holte .......................... | 705/14.54 |

OTHER PUBLICATIONS

Kao et al., WISDOM: Web Intrapage Informative Structure Mining Based on Document Object Model, May 2005, IEEE, vol. 17, Issue 5, pp. 614-627.*
Wang et al., Data Extraction and Label Assignment for Web Databases, May 2003, ACM, pp. 187-196.*
D. de Castro Reis et al., "Automatic Web News Extraction Using Tree Edit Distance," Proceedings of the 13th International Conference on World Wide Web (WWW2004), May 17-22, 2004, pp. 502-511.
B. Liu et al., "Mining Data Records in Web Pages," Proceedings of the Ninth ACM SIGKDD International Conference on Knowledge Discovery and Data Mining (SIGKDD '03), Aug. 24-27, 2003, pp. 601-606.

* cited by examiner

*Primary Examiner* — Wilson Lee
*Assistant Examiner* — Jessica N Le
(74) *Attorney, Agent, or Firm* — Fish & Richardson P.C.

(57) ABSTRACT

Systems and techniques for extracting data from unstructured documents are described. One such method involves assigning one or more labels to one or more nodes in a first object model of a first web page; comparing a second object model of a second web page to the first object model; if the first object model matches the second object model to a determined degree, extracting from the second web page data associated with nodes in the second object model that match labeled nodes in the first object model; and providing the extracted data for storage in a structured database in a manner associated with the labels.

15 Claims, 10 Drawing Sheets

FIG. 7B

DATA EXTRACTION USING TEMPLATES

TECHNICAL FIELD

This document discusses mechanisms and techniques for extracted data from documents such as web pages.

BACKGROUND

The World Wide Web of interconnected web pages can be said to be a gigantic group of connected databases. Each page contains some bit of interesting, or not-so-interesting, information that web surfers can stumble upon and read. Internet search engines use spiders to crawl across the web, jumping between pages using the hyperlinks that point from one page to the next and that form the web. Such search engines may then index the content on the pages so that user requests for similar content, or concepts, can be served by returning the page in a list of search results.

The information on web pages, however, is generally unstructured. In other words, it typically is not formatted in a single, nice database table in which every column has a nice field definition, and every row represents a data item. Rather, web information is formatted for reading, like a book, and not necessarily for analysis, like a spreadsheet. As a result, it can be difficult to sort the data in a web page from the formatting and text that is used to explain the data. Moreover, when the data is spread across multiple pages, users may be required to view numerous web pages in order to understand a full data set that has many pieces of data. In addition, search engines may have a more difficult time classifying the data when it is broken up into an unstructured form and spread across multiple pages.

For example, pricing data for goods on web pages may be split up so that one good appears on each web page of a web site. Such organization may make it difficult to compare prices between multiple goods (e.g., different brands of pens on an office supply web site).

SUMMARY

This document describes mechanisms and techniques that may be employed to extract information from network-accessible documents such as internet web pages. For example, particular data fields may be identified in a first web page, such as by having technicians highlight and tag the data fields. A representation of the page in the form of a tree may then be created, where the representation consolidates certain repeated information (e.g., multiple items in a catalog) into single nodes of the tree. Other web pages on the same site or domain may then be analyzed, and tree representations of those pages, such as DOM trees or consolidated trees like those created for the initial page, may be formed. The tree for the first page and the tree for the subsequent page may then be compared to identify a "distance" between the trees, which may be expressed in the form of an edit distance. If the distance is sufficiently small (and smaller than the distance between the second tree and trees for any other already-tagged pages), the pages may be assumed to correspond to each other in terms of format. The tags assigned to the first page may then be applied to the second page, such as by matching nodes between the corresponding trees. Using the tags, the data at the nodes in the second page may be extracted from the page and placed in a structured format with corresponding data from other matching pages.

In one implementation, a computer-implemented method is disclosed. The method includes assigning one or more labels to one or more nodes in a first object model of a first web page, comparing a second object model of a second web page to the first object model, if the first object model matches the second object model to a determined degree, extracting from the second web page data associated with nodes in the second object model that match labeled nodes in the first object model, and providing the extracted data for storage in a structured database in a manner associated with the labels. In some aspects, the assigning of one or more labels comprises manually selecting elements on the first web page and manually selecting labels for the selected elements. Also, the in the structured database can correspond to the labels, and first object model can be in the form of a template tree that includes single nodes that comprise repeated or optional data structures from the first web page.

In some aspects, the second object model comprises a DOM model. Also, the degree of match can be determined by calculating an edit distance between the first object model and the second object model. In other aspects, the method also comprises comparing the second object model to a plurality of labeled object models from a common web domain and extracting data associated with nodes in a web page whose object model is a closest match to the second object model. The method can also comprise comparing a plurality of object models to the plurality of labeled object models. And the method can also comprise accessing the structured database in response to a search request, and providing one or more search results that include hyperlinks to web pages associated with data in the structured database that is responsive to the search request.

In yet other aspects, the method also comprises identifying the second web page by crawling a plurality of web pages at a domain corresponding to the first web page. The degree of match between the first object model and the second object model can also be determined by computing an edit distance between the models. In addition, the method can include forming the first object model as a composite of object models from a plurality of web pages.

In another implementation, a computer-implemented system for extracting data from electronic documents is disclosed. The system includes a template generator to create object models of network-accessible documents, a template labeler to categorize elements in object models of a first group of network-accessible documents, a template comparison module to determine levels of match between labeled templates and unlabeled templates, and a data extractor to extract data from documents having unlabeled templates at locations corresponding to labeled elements in matching labeled templates, and to store the extracted data in a structured database. The system can also comprise a crawler to identify pages at a domain corresponding to the pages having labeled templates. In addition, the system can include a search engine programmed to search the structured database in response to a search request, and to generate search results that include links to documents associated with data entries in the structured database. In some aspects, the template labeler is programmed to receive manual user labeling of document elements and to match the user labeling to elements in the templates. In addition, the object models created by the template generator can include single nodes that comprise repeated or optional data structures from the first web page. Moreover, the template comparison module can comprise a finite-state transducer.

In yet another implementation, a system for extracting data from electronic documents comprises a template generator to create object models of network-accessible documents, a template labeler to categorize elements in object models of a first group of network-accessible documents, means for comparing document templates to determine a degree of match between templates in the first group and documents that do not have labeled templates, and a data extractor to extract data from an unlabeled document that matches a labeled document, at locations associated with labels in the labeled document. The object models created by the template generator can, in some aspects, include single nodes that comprise repeated or optional data structures from the first web page.

The details of one or more embodiments are set forth in the accompanying drawings and the description below. Other features, objects, and advantages will be apparent from the description and drawings, and from the claims.

DESCRIPTION OF DRAWINGS

FIGS. 7A-7B show screen shots of a data extraction application.

Like reference symbols in the various drawings indicate like elements.

DETAILED DESCRIPTION

Figure 1:
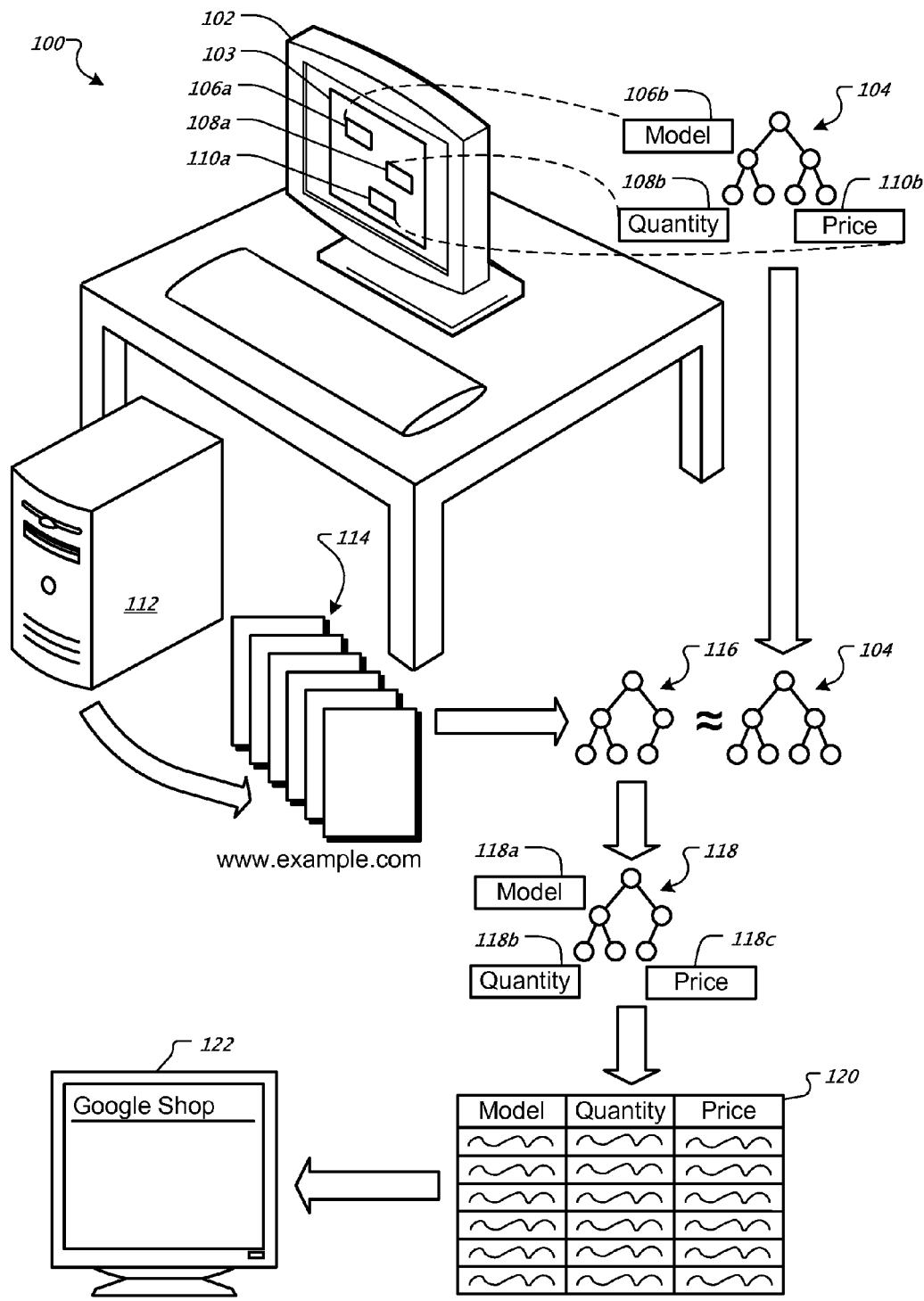
FIG. 1 shows a conceptual diagram of a system and process for extracting information from unstructured documents such as web pages.

FIG. 1 shows a conceptual diagram of a system 100 and process for extracting information from unstructured documents such as web pages. In general, the diagram shows an example of a process by which a technician sitting at a computer terminal 102 may identify particular portions of a page that are expected to be relevant for data analysis and searching of the page. Such portions may include information about an item for sale (e.g., price, quantity, and description), certain airfares (e.g., dates, times, start/end locations, and prices), and other such information that may be similar across multiple web pages but may have differing values from page-to-page. The location of such data on the page may be determined by forming or otherwise accessing an object model of the page, and nodes or other parts of the object model may be labeled, such as by labels assigned by the technician (e.g., "price," "quantity," etc.).

With an initial page or group of pages analyzed and labeled, other pages may be analyzed automatically in an attempt to extract information from those pages that corresponds to the information labeled by the technician on the initial page. Such analysis may involve crawling across all of the other pages at the web domain of the initially analyzed pages, forming an object model for each located page, and then comparing such object models to objects models for previously analyzed pages to determine a degree of match. If the match is sufficiently close (and closer than the match for any other page), the target page and the initial page may be assumed to be matching pages that differ only in particular content. For example, both pages may be product sales pages that follow a common format on a web site, but with different products, quantities, and prices on each page. When a match is found, the labeled portions of the initial object model may be applied over to corresponding portions of the target object model, and data corresponding to those locations may be extracted, or copied out of, the second page and placed into a structured database such as a table. The labels that were initially provided may serve as metadata from the data on the page, such as by being used as column identifiers in a structured database table.

Referring now to FIG. 1, as an initial step, a technician operating a computer terminal 102 may be assigned to classify certain web pages so as to identify particular content on the pages. For example, the technician's employer may wish to create a database of product pricing for a number of goods so as to permit comparison shopping. As a result, the technician may initial display a web page 103 that includes the data the employer would like to have tracked. The technician may visually review the page and locate relevant product information, such as a model name 106a, a quantity of that model listed on the page 108a, and a price for the goods 110a. The user may indicate the location of such information by dragging across each piece of information to highlight it, and then selecting a command from a running application to identify the selected content.

At each piece of selected content and invocation of a command to identify the content, a pop-up box or other interface may be displayed to the user and may permit the user to enter a label for the selected text. For example, a blank text box may be provided where the data of data to be highlighted may vary greatly and the technician needs maximum flexibility to define new and unique labels. In contrast, where the task for the technician is fairly well defined, a small group of possible labels may be provided to the technician in the form of a pull-down menu or similar mechanism. Thus, for example, a technician who is reviewing an online shopping site, he or she may be allowed to select only the labels of cost, quantity, and description. Such a restriction may permit for greater data integrity later in the process.

When the technician identifies a page for analysis, their computer system may access or form an object model 104 of the page, such as when the technician first highlights and labels content on the page. The object model 104 is a collection of objects through which the page can be examined and manipulated. The HTML Document Object Model (DOM) is a very common example of an object model, particularly for web pages. Generally, the object model 104 may be represented by a template tree showing the various elements of the page in a hierarchical arrangement of interconnected nodes.

The object model 104 here, as described in more detail below, may differ from a typical object model such as a DOM, by including nodes in the template tree that represent repeated or options structure. In particular, the nodes in the tree may take two general types: (1) "data nodes" that represent concrete elements such as tags (which represent the span of an HTML) or text (which represent plain text in the document); and (2) "group nodes" that represent repeated and/or optional structure. For example, where a table on a web page contains many records, the records may be merged together in the template tree under a single group node. In one implementation, group nodes may have one of three definitions: (1) zero-to-one for optional groups (and denoted with a "?" herein); (2) one-or-more for repeated groups (and denoted with a "+" herein); and (3) zero-or-more (denoted with a "*"

herein) for optional repeated groups. An example of such a template tree is discussed in more detail below with respect to FIG. 3.

With the object model 104 formed, labels 106a-106c may then be placed on particular nodes relating to data on the web page 103. The labels 106a-106c may represent metadata associated with the web page elements that were identified by the technician. For example, where a technician highlighted a price 110a on a page, the technician could type in or select the label 110b "price" to be associated with the relevant node in the object model 104. Similar approaches may be taken for assigning the "model" label 106b and the "quantity" label 108b.

The object model 104 may also have an structured database such as a database table or tables associated with the model 104. Such structured database may serve as a recipient of data from the web page 103 and other similar web pages. In certain implementations, the fields in the database may take the names of the labels assigned by the technician. Thus, once the technician has annotated the web page 103, the data that is instantiated at the identified elements of the page 103 may be extracted to the structured database according to the provide labels.

Such labeling may then continue to a different web page, and multiple such annotated object models may be stored by the system. The system may also make determinations regarding whether the multiple annotated models are sufficiently similar that the data from their associated pages should be stored in a single database or in different databases. The comparison techniques described below may be used for such a determination, for example. Also, where the sample pages selected by the technician vary in different manners, the system may take into account such variation and may form a composite or generic object model that accurately, but more generally, reflects the structure of the pages as a group.

At a later time, an automated process running on server 112 may be begun. In general such process may involve crawling across multiple pages 114 at one or more domains associated with pages that have already been annotated. In other words, technicians may select certain pages for annotation, and then may set the automated process free to locate other such pages. The crawling may occur in well known manners, such as by traversing hyperlinks from page to page at a site. In addition, scripts or other mechanisms may be used to populate dynamic content on such pages, such as by supplying a product search term or identifier to a commerce site so as to have a page generated that shows information about the product. Here, the example domain is listed as www.example.com.

For each located page, an initial analysis may be conducted to determine if the page has any relationship whatsoever to pages that have been annotated. If the page is sufficiently close to be considered a candidate for comparison, the DOM for the page may be accessed and, in certain cases, an object model 116 containing data nodes and group nodes may be generated. That DOM or object model may then be compared to object model 104 and other annotated object models to find a closest match for the object model 116. A match may be considered to occur, in one example, when the comparison with one annotated object model is closer than a comparison with any other annotated object model and/or when the comparison shows that the particular annotated object model and the un-annotated candidate object model are sufficient close to each other, such as by mechanisms described below.

Once a match has been made, the annotations from annotated object model 104 may be passed to the un-annotated candidate object model 116 as shown by object model 118. The transference of the labels or annotations may occur node-to-node between trees where particular data nodes match each other. Where there is no such obvious match, a node in the candidate object model 118 that most closely matches a labeled node in the annotated object model 104 may receive the corresponding label. Here, the transferred or copied labels include label 118a for "model" and corresponding to applied label 106b; label 118b for "quantity" and corresponding to applied label 108b; and label 118c for "price," and corresponding to applied label 110b.

With the labels associated with the object model 118, data may be pulled from the model 118 and applied to a database 120 using the labels. In one example, the labels may be matched to fields in the database 120, and the content corresponding to labeled nodes in the model 118 may be extracted from the page by copying the content to a corresponding entry in the database 120.

Once the database is sufficiently populated, its contents may be made available, such as to a publicly available search engine. Requests submitted to the search engine may, among other things, be converted to queries for the database 120. Responsive information may be found in the database and formatted for presentation to the requester. In addition, a hyperlink to the originating page among pages 114 may be stored in the database 120 and provided in response to the search request, as shown on screen 122.

The process just described may also be repeated over time, for example, by a technician initializing a system to a particular domain by training it with several annotated pages, and then with the domain being repeatedly scanned over time for changes, and with data being extracted from the pages as they change and the data being updated in database 120. In this manner, data may be extracted from unstructured sources such as documents in the form of web pages, by training the system on some pages and then finding organizational similarities between the training pages and other pages.

Figure 2A:
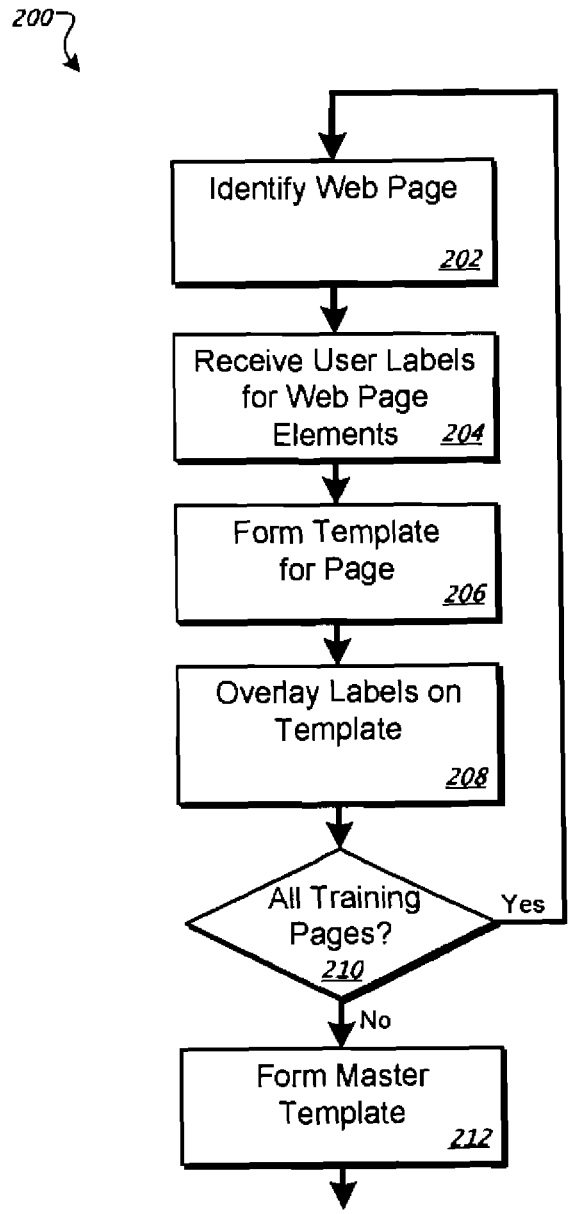
FIGS. 2A-2B show flow charts of a process for extracting information from web pages.
Figure 2B:
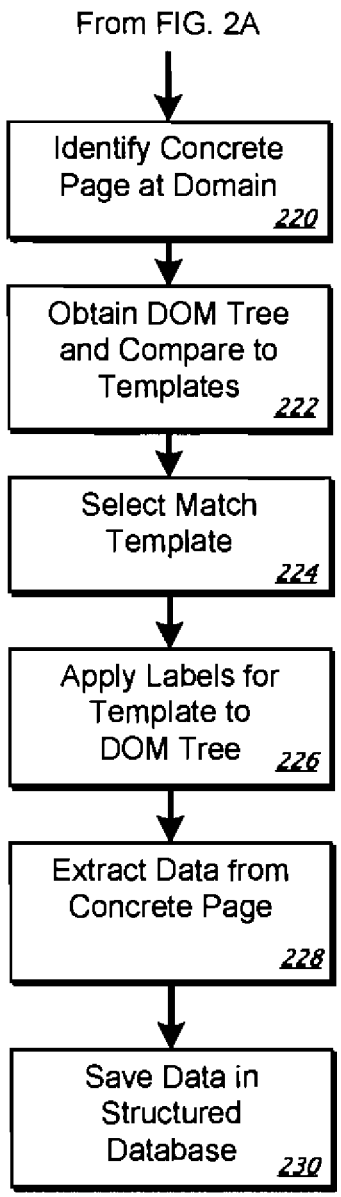

FIGS. 2A-2B show flow charts of a process 200 for extracting information from web pages. The chart of FIG. 2B may generally be considered to be a continuation of the chart in FIG. 2A. in general, the process 200 involves identifying one or more initial web pages or similar documents, assigning labels to elements within those documents, associating the labels with nodes in a template or templates for the documents, and then finding other web pages or documents that match the initial annotated web pages or documents. The labels from the annotated web pages or documents may then be applied to the located matching web pages and content from those matching web pages may be extracted for provision to a structured database. The data in the structured database may also be tied back to the original pages, such as by storing a hyperlink with each record in the structure database, so that the structured database may be used to provide search results, and those search results may link back to the originating web page.

At box 202, a web page is initially identified. The identification of the web page may occur manually or automatically or by a combination of the two. In manual identification, for example, a technician may be assigned to profile a particular portion of a Web domain or portions of a domain, and may surf through pages at the domain to find relevant web pages. Such web pages may include pages that present information such as travel information, shopping information, and other information on which the public may want to search. The technician may have an annotating application operating while he or she is locating pages so that he or she can easily provide annotations associated with those pages as described more fully below. In an automatic implementation, a web crawler may look for pages that match a profile of pages having desired content, such as pages associated with a known e-commerce provider that are organized in a particular manner (e.g., with tables containing numeric values, thus indicating quantity pricing and the like) or that contain certain content (such as dollar signs, that indicate the page is showing an item for sale). The automatic system may then queue such pages for review and annotation by human operators.

At box 204, the process receives user labels for web page elements for the identified pages. For example, a technician may highlight content on a page and select an icon to perform a labeling action for the page. Such an action may involve the technician typing a label for the content or selecting a label from a list of multiple pre-approved labels. For example, a technician looking for information at shopping sites may label certain information regarding products for sale, such as descriptions of the products, prices for the products, manufacturers of the products, model numbers of the products, and other such information. Labels may also be applied automatically, such as by a system identifying content on a page that appears to match a particular label or type of data, presenting such suggested labels to a user for confirmation, and receiving editing or confirmation from the user to ensure that the labels are placed properly and categorized properly.

At box 206, a template for the page is formed. The template may take the form of an object model for the page or other form of document, such as a document object model (DOM). The object model may also take a form like that discussed below, where certain nodes in a tree representing the model may be data nodes and certain other nodes may be group nodes that aggregate multiple data entries on a page into a single node. Once a template has been formed for a page, and labels have been received for elements on the page, the labels may be applied to nodes in the template that correspond to the webpage elements, as shown at box 208. The correlation of labels to nodes, so as to create an annotated object model, may be performed in a variety of manners.

At decision box 210, the process 200 determines whether all training pages (e.g., all pages at a domain sufficient to give the process enough data to identify and extract relevant data in other pages) have been annotated. If they have not—for example, if a user is still looking for additional pages or an automatic system still has pages in its queue for a user to review—the process of identifying web pages and providing labels for object models associated with those pages may continue. If all training pages have been identified and annotated or labeled, a master template may optionally be formed, as shown at box 212. In particular, if multiple of the annotated pages are very similar in format, a single object model may be created that captures the general format of all the pages. For example, if all of the pages have repeating elements in a table at a particular location on a page, but some pages have four elements in the table and other pages have 10 elements in the table, the master template may simply indicate that a table exists with certain repeating elements. The master template may then be formed by selecting one of the annotated templates and discarding the others, by forming a third template that combines aspects of both templates, or by other appropriate mechanisms. In one example, where an object model having data nodes and group nodes is used, pages having tables with varying lengths may have an object model that matches across all of the pages, so that only one of the object models needs to be tracked, and all of the pages may be correlated to a common database.

Referring now to FIG. 2B, once one or more annotated templates or object models have been formed in the process of training a system, the process 200 may shift toward identifying other pages that might match the annotated pages in format or structure. At box 220, an un-annotated page, referenced here as a concrete page, maybe identified. Generally, the page may be identified automatically by crawling across web pages at a domain that matches the domain for the training pages, under the assumption that pages having common format will almost always be at a common domain. Other domains may also be searched, for example, when a system operator knows that two different domains are operated by a common webmaster or controller, or when the domains use common authoring software.

With the concrete page identified, the process 200 may obtain the DOM tree of the page and/or create an object model that includes data nodes and group nodes, as shown at box 222. The process 200 may then attempt to match the target concrete tree object model with object models for annotated pages that have been previously stored, such as by computing an edit distance between the various pages. At box 224, the process 200 selects a template that matches the concrete page, from among the available annotated pages. At box 226, labels from the annotated template are applied to the DOM tree or other object model for the concrete page. The labels may be applied at nodes that correspond to labeled nodes in the object model for the training page.

Using the applied labels, data is then extracted from the concrete page at the nodes corresponding to the labels. In extracting the data, it is not necessary to actually provide the labels to the object model. Rather, identifiers for each node in the object model may be associated with particular labels, such as in a lookup table or other data structure. From the particular nodes in the concrete tree that correspond to the nodes in the lookup table for the training tree may then be identified and correlated to the labels in the lookup table. In this manner or in other appropriate manners, actual data on the pages relating to the concrete tree may be identified and may be extracted from the concrete page, as shown at box 228. The extracted data may then be saved in a variety of manners, such as in a structured database like a database table or multiple database tables in a relational database.

Figure 3:
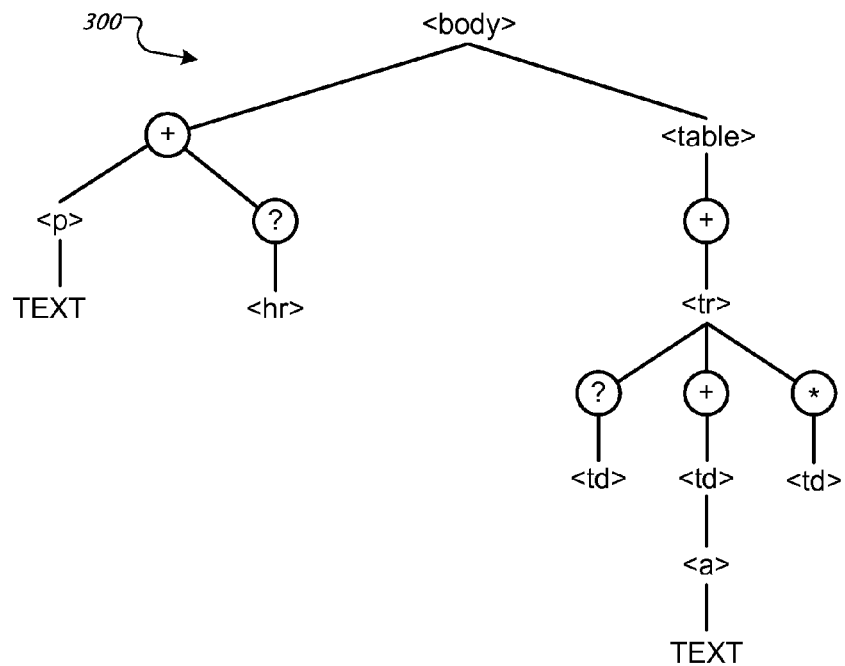
FIG. 3 shows an example web page template.

FIG. 3 shows an example web page template 300. The particular web page represented by the template 300 includes repeated structure in the form of group nodes and data nodes. Group nodes (i.e., nodes that represent repeated and/or optional structure) in the template are marked with circles. Data nodes represent concrete elements of a tree, such as tags, text, or images for HTML documents.

The left sub-tree represents one or more repeating paragraphs of text that are optionally separated by a horizontal rule (<hr>). The repeating nature of the paragraphs is shown by the "+" node, and the optional nature of the <hr> tag is shown by the "?" tag. Such a subtree may be formed by analyzing a page or a DOM tree for a page that contains a number of paragraphs in a row, some of which are separated by a horizontal rule and some of which are not.

The right subtree represents a table that includes one or more rows (as shown by the "+" node followed by the <tr>, or table row, tag node), where each row starts with an optional empty table cell (as shown by the first node in a group of three nodes having a "?" designation) followed by one or more cells having a text link (where the one-or-more is shown by the "+" node, the cell nature is shown by the <td> node, the text by TEXT, and the fact that the text is a link by the <a>, or achor hyperlinking, tag), and followed by zero or more empty table cells (as shown by the zero-or-more "*" designator and the <td>, or table cell, tag). Such a subtree may be arranged upon analyzing a portion of a page or a DOM that has a table with rows of data, where sometimes the first column is blank and sometimes it is filled, the last column may be in place but is always blank, and the intervening columns generally contain hyperlinks.

As can be seen, such a representation of a web page or other document represents the content and format of the document in a manner that generalizes the document over repeating and optional content. In other words, rather than representing each piece of content explicitly, the table 300 can fill in minor differences between various instances of a particular type of content. Such a representation may, as discussed more fully herein, permit more ready comparison of pages that have slightly differing content, e.g., because some may have more table entries than do others, but are all based on the same underlying web page.

In analyzing trees here, it may be preferred in certain circumstances to ignore group nodes (the circled nodes in the figure here). For example, it might be said that a first data node is a "data parent" of a second data node even if there are intervening group nodes between the two data nodes in the tree. Applied to FIG. 3, the <p>, <hr>, and <table> nodes all have the <body> nodes as their data parent. Conversely, the <p>, <hr>, and <table> nodes would be referenced as the "data children" of the <body> node. The order of nodes may be significant, as will be discussed below; for example, the <hr> node in this example is the second data child of <body>, while the <tr> node is the third data child of <body>.

Figure 4A:
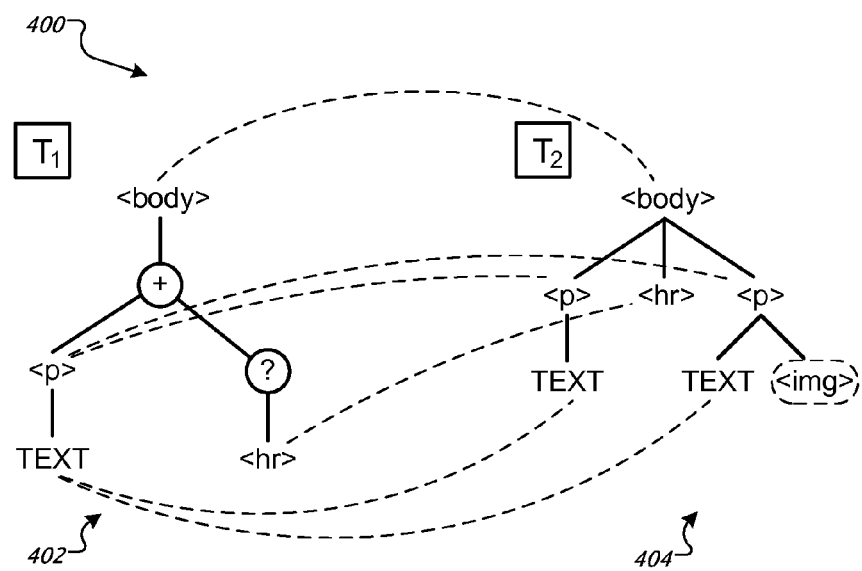
FIG. 4A shows a comparison between two web page templates.

FIG. 4A shows a comparison 400 between two web page templates 402, 404. In this example, template 402 may be considered to be a training template that has been labeled or annotated, whereas template 404 may be considered a concrete template that is not yet annotated. Comparison of the two templates may occur by initially a lining the template trees, and then computing an edit distance between the template treaties. In full operation, such a comparison process may occur between numerous trees, such as by identifying a concrete tree and then comparing it against all training trees that are expected to be potentially relevant to the concrete tree, such as all trees in a particular path at a domain or all trees for the domain.

Tree alignment provides the process with a mapping from nodes in one template 402 to nodes in the other template 404. In the example described here, the alignment of trees falls a top down process, where group nodes are not included in the process because group nodes are in the tree simply to carry meta-information rather than information from the particular visible page content itself. By top down, it is meant that if a first node in a first tree is mapped to a second node of a second tree than the data parent of the first node will be mapped to the data parent of the second node. In other words, to mapped data nodes will have the same data depth, or distance from the root of the tree without counting group nodes, of their respective trees. By providing such a restriction, the complexity of the problem may be reduced because once it is decided to map the first node to the second node, then when determining a best match for a child of the first node a process may need to consider only children of the second node.

The actual alignment process is guided by measuring a distance between two template treaties and computing mapping that minimizes the distance between the trees. Such distance may be computed as the edit distance between the two trees, which is the cost of an operation sequence that transforms the first tree into the second tree. Operations in such an operation sequence may include inserting a node from the first tree into the second tree, deleting a node in the second tree, and replacing a node in the second tree with a note in the first tree. In general, each of these operations will apply to data nodes only, as group nodes may be considered only to the extent that they permit the process to ignore or reuse certain data nodes.

Each such edit operation is associated with a cost that is a function of the nodes that are involved in performing the operation. For example, in this example, the cost of the inserting or deleting a data node may be set at one. Generally, an optional group node (e.g., "?" or "*") may be skipped without incurring a cost but only if it is skipped in its entirety. As one example of this concept, consider a tree that has a <body> data node at its root, connected to an optional "*" node, which in turn connects to two nodes—a <p> data node and an <img> data node. Further consider that the <p> node connects to a TEXT node. Such a model may represent a web page that has zero or more instances of repeating text and image entries. Such a tree can match a single <body> node without cost, but for every text paragraphs that matches, an <img> node must accompany the <p> node or the cost of a delete operation will be incurred.

A replacement cost is the cost of replacing a node on a second tree with a node on the first tree. The cost is zero if the first tree's node and the second's tree's node are equivalents, and is infinite if the two nodes cannot be compared at all. Otherwise, the cost is some positive finite value representing the penalty of replacing the second node with the first node. A node can be reused in multiple replacements if the node is a descendant of a repeated group node (e.g., a "+" or "*" node).

One tree can be transformed into another tree generally in a large number of different ways. In this example, the most relevant form of transformation is the transformation that has lowest cost or minimum edit distance. Referring to FIG. 4A, an example for computing a transformation cost or edit distance will be described. If one assumes there is no cost of replacing one text node with another text node, or a tag node with another tag node of the same type, and an infinite cost for any other relevant replacements, then the minimum edit distance between these trees is 1. In particular, the <body> to <body> cost is zero because the correlate exactly. Likewise, the <hr> to <hr> cost is zero because, although one of the tags appears to be at a different location in the tree, they are in the same location once group nodes are put aside. Next, the TEXT to TEXT distance is zero, but the nul to <img> distance is 1 because it requires a deletion from $T_2$.

Note that two of the nodes in table $T_1$ can each be replaced with multiple nodes in table T2 because the nodes in $T_1$ are part of a repeated group (so they implicitly can include multiple nodes). If the <p> node had not been able to be reused in table $T_1$, the second paragraph in $T_2$ would have required deletion to make the table match, and would have resulted in an edit distance of 3 rather than 1.

Figure 4B:
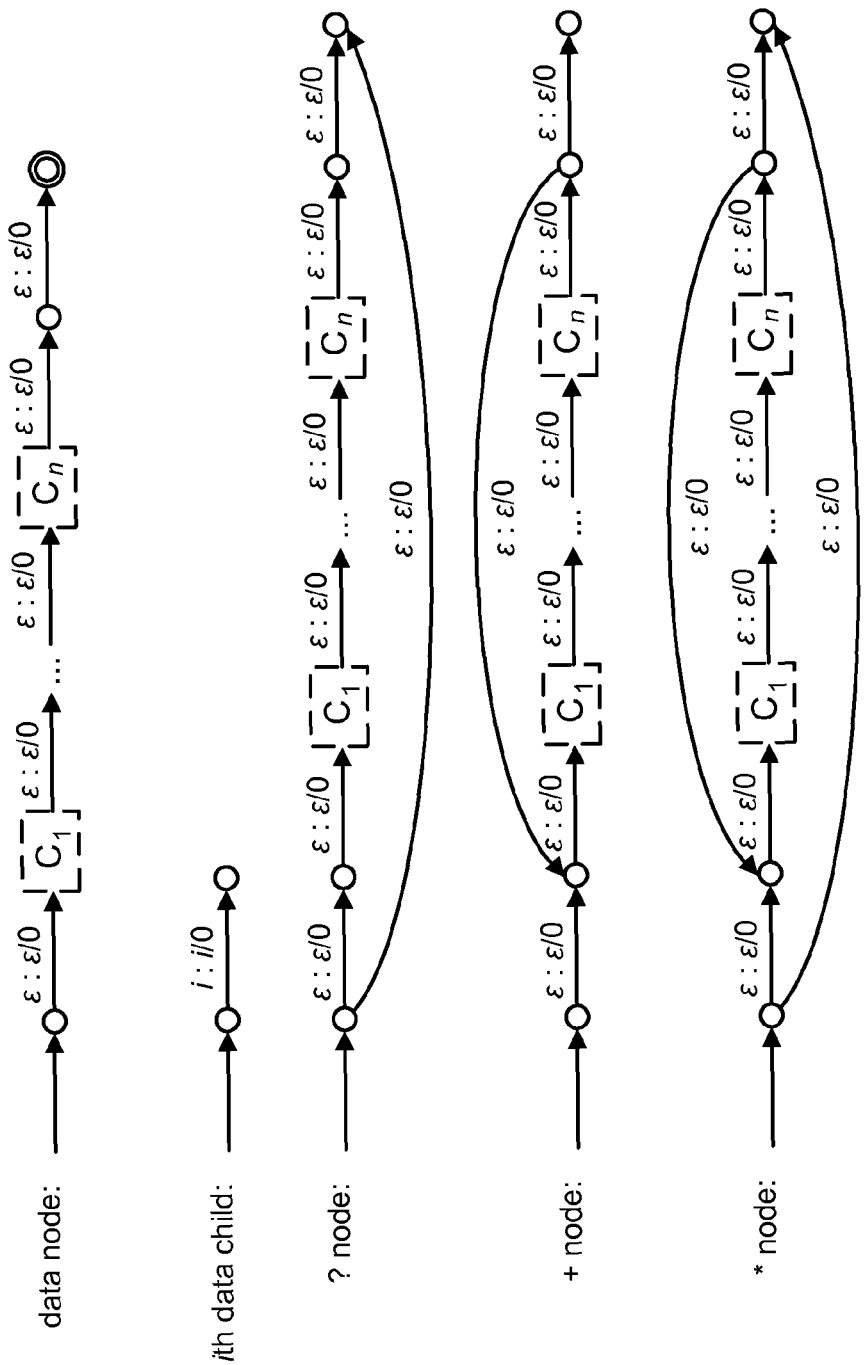
FIG. 4B shows state diagrams for a template comparison process.

FIG. 4B shows state diagrams for a template comparison process. These diagrams illustrate a weighted finite-state transducer (FST) that may be used to efficiently calculate edit distance between a first data node ($n_1$) and a second data node ($n_2$), i.e., by transforming the data children of the first node into the data children of the second node. The particular state machine here is a composition of three FST's: $M = D_1 \circ O \circ D_2$. The $D_1$ FST represents the left-to-right traversal of the data children of $n_1$. The $D_2$ FST represents the left-to-right data traversal of the children of $n_2$. All transitions in these two machines have zero cost. The O FST in the middle represents the possible edit operations on the data children of $n_1$ and $n_2$, with their associated costs.

The construction of $D_k$, which is a chain of FSTs (one for each child of $n_k$), is at the top of FIG. 4B. The construction for the child FSTs, $C_1$ through $C_n$, is recursively defined in the lower portion of FIG. 4B, with the base case being a data child of $n_k$. The FST for the ith data child of $n_k$ has a single transition, with I as both input and output symbol. Many of the $\epsilon{:}\epsilon/0$ transitions are present here simply to make each construction rule self-contained. Such transitions may, in certain implementations, be left out of an actual construction of $D_k$ to reduce its size.

The O FST includes a single accepting state with multiple self transitions representing different edit operations. A transition of $j/T_{ij}$ represents replacement, where $T_{ij}$ is the minimum cost of replacing the subtree rooted at the jth data child of $n_2$ with the subtree rooted at the ith data child of $n_1$. This replacement cost, in certain implementations, may be recursively defined. The transition $\epsilon{:}j/a_j$ represents adding of the subtree rooted at the jth data child of $n_2$, where $a_j$ is the cost of adding the entire subtree. In a like manner, the transition $I{:}\epsilon/d_i$ represents deletion of a specific subtree.

With the FST M given, one can compute the minimum edit distance between two trees with data nodes as roots by computing the least cost path of M. The edit distance will be equal to the cost of that path. If transition along the least-cost path is tracked, the edit operations that result in the minimum edit distance may also be determined. All pairs of nodes that appear in replacement operations may be included in order to obtain the minimum-distance node mapping for template-tree alignment.

Figure 4C:
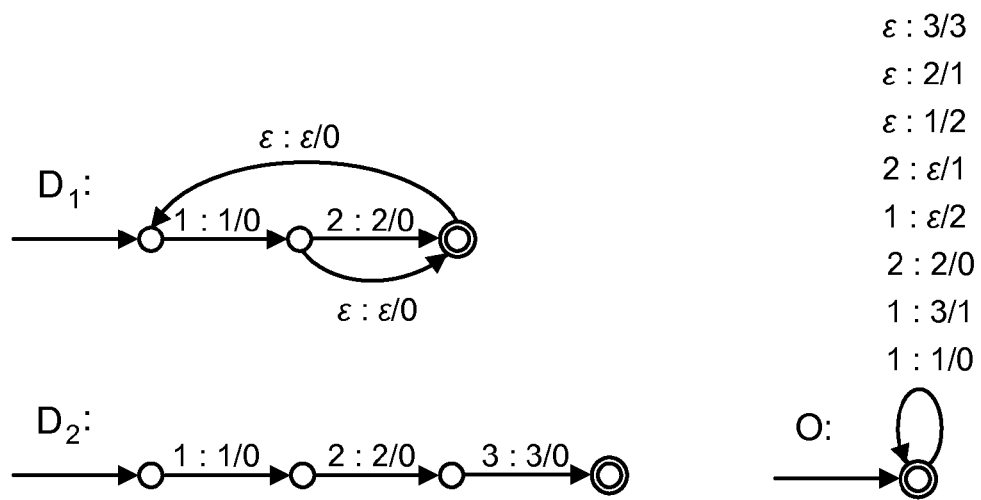
FIG. 4C shows additional state diagrams for a template comparison process.

FIG. 4C shows additional state diagrams for a template comparison process. This figure shows the FSTs—without showing superfluous $\epsilon{:}\epsilon/0$ transitions—for matching the data children of the two root nodes in FIG. 4B. Some of the costs on the transitions in O are obtained by computing the edit distance between subtrees, which demonstrates the recursive nature of this particular process. The least-cost path for the composite FST includes transitions 1:1/0, 2:2/0, 1:3/1, and $\epsilon{:}\epsilon/0$, so the edit distance is 1 and there are three node mappings for the purposes of tree alignment.

Figure 5:
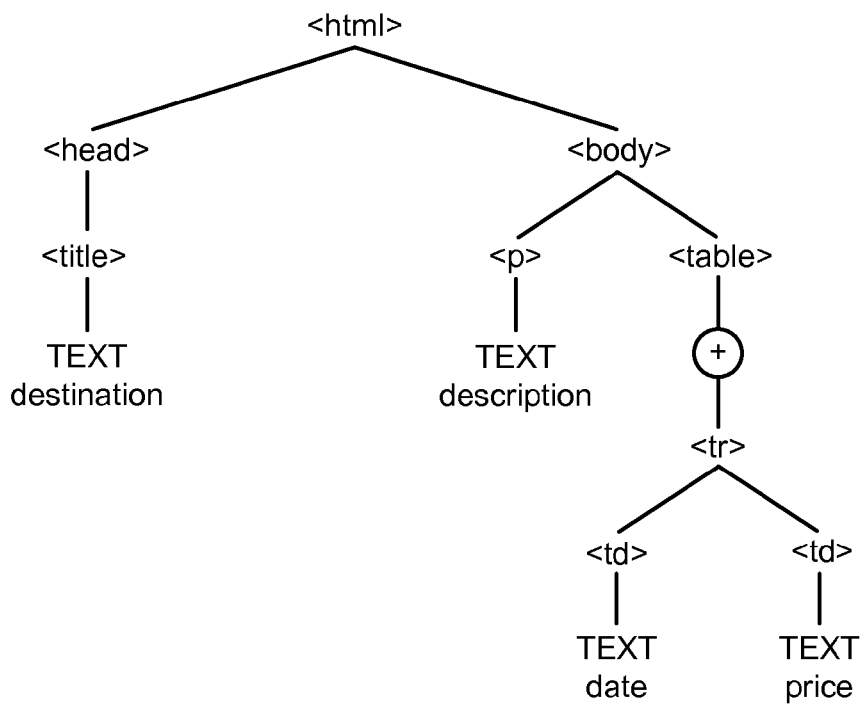
FIG. 5 shows a labeled web page template.

FIG. 5 shows a labeled web page template. This template may represent a tree that is formed from trees associated with multiple documents, where the originating tree are concrete trees that do not include group nodes, and the template tree is a general representation that represents most of not all of the concrete trees and generalizes repeating structure from any of the pages into group nodes.

A template tree in this example may generally be constructed in three steps: (1) multi-tree alignment; (2) repeat analysis; and (3) detection of optional structures. Alignment of trees may play a role, in certain implementations, in all three steps. By the first step, a single tree is created that incorporates all nodes from the concrete input trees (i.e., trees that have no group nodes yet). Some tree is selected from the trees to serve as a seed template tree, and unaligned nodes of the other template trees are then added until every node in the input tree aligns with some node in the template tree. By this step, a template with no group nodes is created.

In the second step, structure that repeats is collapsed into group nodes. This may occur by adding group nodes with multiplicity of one-or-more ("+") parameters. Tree alignment can then be used to determine if two subtrees are structurally similar. For example, if the <body> root node has alternating <p> and <hr> nodes as children, then those nodes may be replaced by a single group node with a <p> child and an <hr> child, as discussed above. Nested repetition can be handled by repeating the analysis for repeated structure in a bottom-up order. For this part of the process, alignment of two template trees can be important, as opposed to mere alignment of a template tree with a concrete tree.

In the third step, the template tree is aligned with all the concrete input trees and optional nodes are identified and marked in the template tree through the insertion of an optional group node. A template node may be considered optional if it does not align with some node in all input trees.

Referring to FIG. 5, certain of the TEXT data nodes are shown as being labeled or annotated with labels of "destination," "description," "date," and "price." Apparently, this template references to a travel web site. Because the date and price labeled nodes are descendants of the same group node, they can be grouped together in the extracted data. For example, they may be treated as separate records for the same fields in a database to which the web page information may be extracted.

The data associated with the labeled nodes may be extracted by using the tree as an extraction template at the locations of the labels. To extract information from an HTML document, the labeled template tree may be aligned with the concrete tree representing the document. The information from the nodes in the concrete tree that align with labeled nodes in the template tree are then extracted.

As discussed above, the template trees allow a mechanism by which to express repetition and grouping, which permits for the extraction of repeated and grouped information on a web page.

Figure 6:
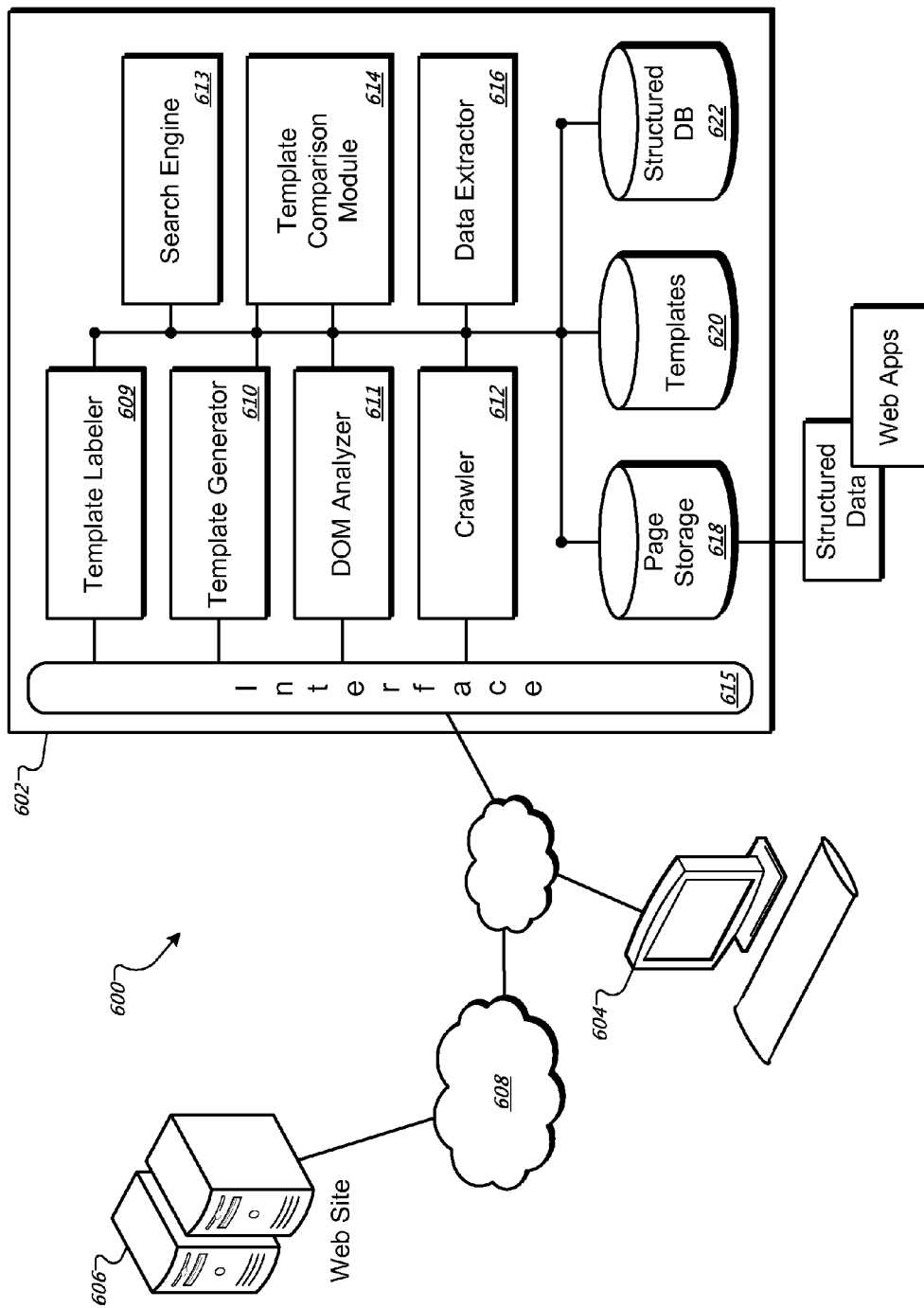
FIG. 6 is a schematic diagram of a system for extracting information from documents such as web pages.

FIG. 6 is a schematic diagram of a system 600 for extracting information from documents such as web pages. In general, the system 600 includes a server 602 that may be controlled and monitored at a terminal 604, that is in turn connected to other servers such as Web servers 606 through a network 608, such as the Internet. The server 602 and servers 606 may include one or more server devices programmed to carry out particular computing functionality as described in more detail below. The particular arrangement and organization of the servers is not critical.

The server 602 may have a number of components dedicated toward data extraction from documents such as web pages. For example, a template generator 610 may create templates having data and group nodes relating to particular web pages or other documents. DOM analyzer 611 may, for its part, identified DOM trees for web pages to be analyzed by the system 600. Such components may be managed through interface 615 by an operator at terminal 604. For example, the operator may identify particular web pages for which templates are to be generated, and may call for other actions by the system 600. In addition, a crawler 612 may locate additional web pages automatically, such as by traversing connections across a particular domain or following a site map submitted by a manager of the domain. The crawler may submit pages to the DOM analyzer 611 and the template generator 610 for analysis. A template labeler 609 may cause labels or annotations to be associated with nodes in particular templates as discussed above. The template labeler 609 may take inputs for labels from an operator at terminal 604 and may transfer those labels to particular nodes in tables that are associated with a web page being viewed by the operator.

Template comparison module 614 may perform all alignment and comparison between and among templates being analyzed by a system. For example, a labeled template may be compared to one or more concrete templates to determine a level of distance between the templates so as to determine whether an unlabeled page should be labeled in a manner corresponding to the labeled page.

A data extractor 616 may receive input from the template comparison module 614 regarding templates that match in structure, and may use alignment between the templates to identify information on a concrete page to be extracted to a database. For example, the data extractor 616 may map nodes from a first table to a second table and may then identify data on the second table for nodes that correspond to labeled nodes in the first table. Such data may then be copied by the data extractor and provided to a separate database.

A search engine 613 may also be part of the server 602 and may take the form of a variety of different search engines. For example, the search engine 613 may receive requests from users of the system 600 and search various corpuses of data to locate responses. Such corpuses of data may include, for example, structured database 622, where data extractor 616 may store information that extracts from web pages or other documents. The search engine 613 may provide information from the structured database 622, and may also provide mechanisms such as hyperlinks by which a requester of information may readily be connected to the page from which the information was obtained.

Other databases may also store information relevant to the operation of server 602. For example, a templates database 620 may store templates for a number of object models that have been analyzed by the system 600 or are to be compared to other object models in the form of templates by system 600. Page storage database 618 may store additional information about particular pages such as index data for a search engine, full archived copies of web pages, and other similar information. In addition, page storage 618 or templates database 620 may include information relating to labels or annotations for web pages and or object models of web pages.

The server 602 may communicate with a variety of outside systems, such as Web servers 606. The Web servers 606 may be standard Web servers that provide access to Mark up code for generating web pages. In this example, the Web servers 606 provides information, such as travel or shopping information, in the form of HTML web pages, and does not submit the information to server 602 through a data feed or other such formal mechanism. As a result, server 602 may use a components described above to identify and extract data from the various web pages served by Web servers 606

Figure 7A:
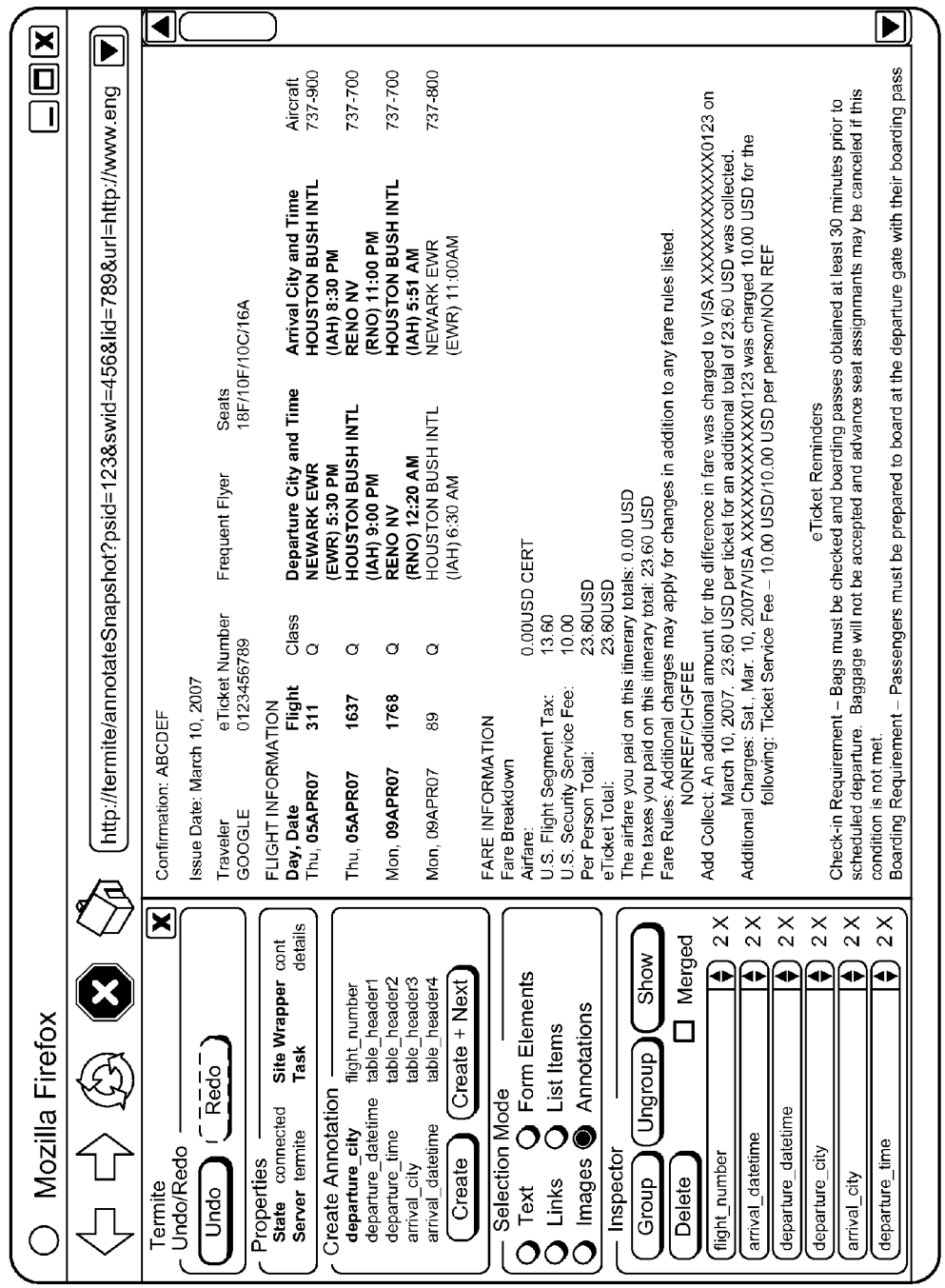
Figure 7B:
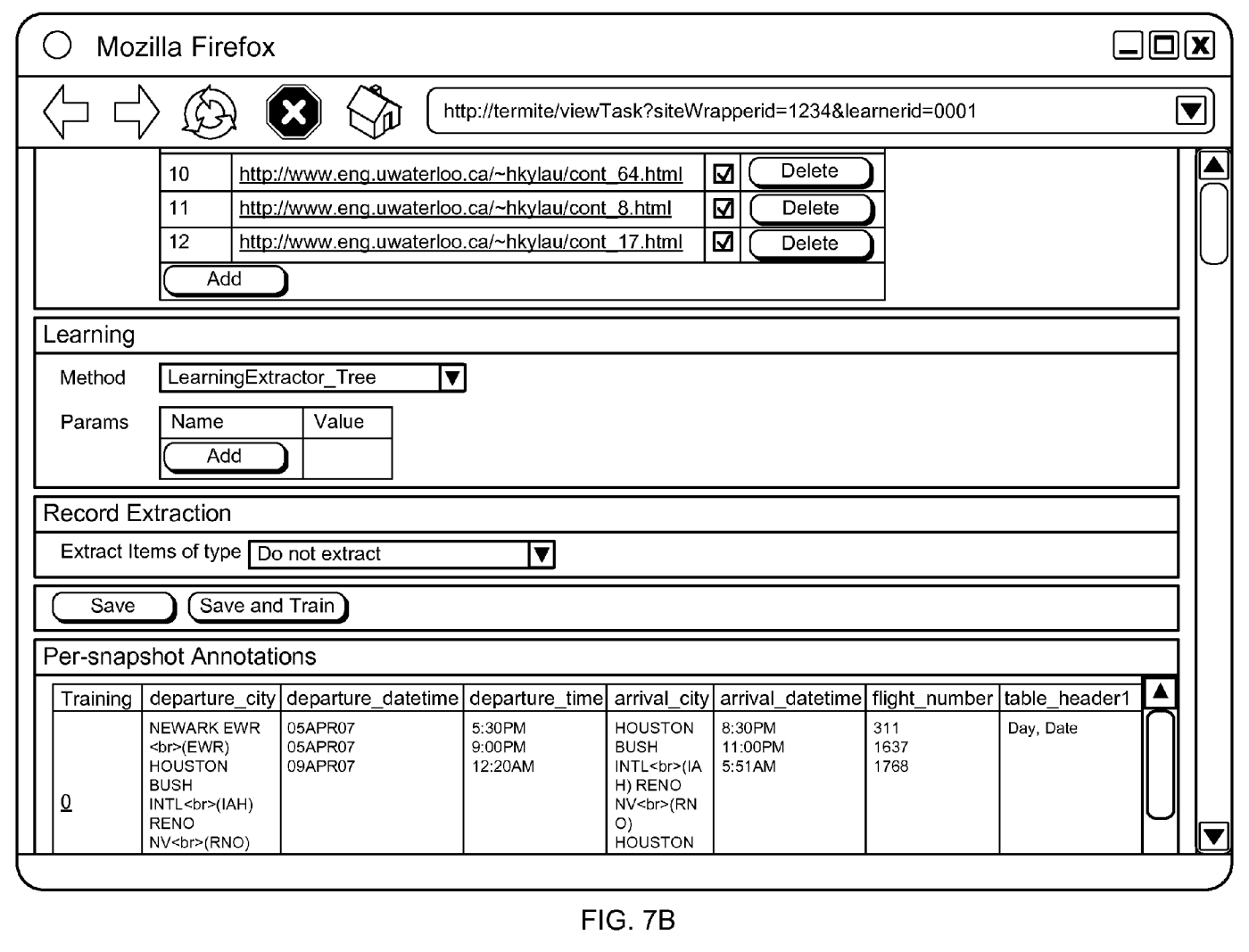

FIGS. 7A-7B show screen shots of a data extraction application. FIG. 7A generally shows an application that may be used by a technician who is tasked with identifying relevant data on web pages as the beginning of a data extraction process. As pictured, the application runs inside a web browser and permits an operator to annotate certain elements within the web page with particular labels.

As can be seen, the operator has highlighted, in different colors or shades, various pieces of data on a web pages that shows an airfare and corresponding travel information for a flight. A properties pane informs the operator regarding whether they are currently connected (the "state"), the server to which they are connected, the particular site wrapper (or unit that holds the various rules for data extraction) they are using, and the task within the site wrapper that they are using (i.e., each task has a separate model for extraction and separate chaining of pages, and a wrapper may include multiple tasks). In general, the items shown in the properties area allow a user to quickly see how they will be navigating a site or sites.

A create annotation pane allows a user to create an annotation to be linked to certain highlighted text. For example, a list of pre-approved annotations may be provided and the user may select from those annotation for particular selected elements on the page; the user, where the user is trusted to identify proper annotations, may also added new annotations to the list. A selection mode pane allows the user to set particular parameters for their selection of data. For example, where selection of a hyperlink on a page will typically cause a program to move to another page, setting a mode to annotations may instead cause the program to permit a user to annotate the link when it is selected. Likewise, a "list items"
mode may permit a user to drag across an entire list of objects and thus apply a single annotation rather than having to apply annotations to each member in a list. And an "inspector" pane shows a user to see certain properties of currently selected page elements, and to group or ungroup those elements with other elements on a page. Selecting "show" will cause other annotations in a common group to be highlighted.

In general, this screen shot is an example of one interface by which web pages may be manually annotated as an early step in processes like those discussed above. It will be appreciated that a variety of other suitable interfaces may also be employed.

FIG. 7B shows a screenshot of an application for presenting extracted information for review by a user. A number of web pages are shown in a pane at the top of the screen shot, representing pages that have been analyzed to extract data. A "learning" pane shows an example learning technique that has been selected for this extraction process. A variety of learning techniques may be used by which certain pages are used to train a system so that it may intelligently locate and extract information from other pages. A "record extraction" pane indicates whether a user has chosen to have items of a particular type extracted. For example, a user may wish to extract a geographic address as a single element even though the portions of that address may be somewhat scattered. The record extraction permits the user to select or specify a rule for such extraction so that the separate pieces are extracted together.

Finally, a per snapshot pane shows data that has been extracted from the pages in a structured format. Here, the data is organized according to annotation labels as fields, and particular web pages as records. An initial training page from which the data was manually identified occupies the first record, and data that was automatically extracted occupies the other records.

Figure 8:
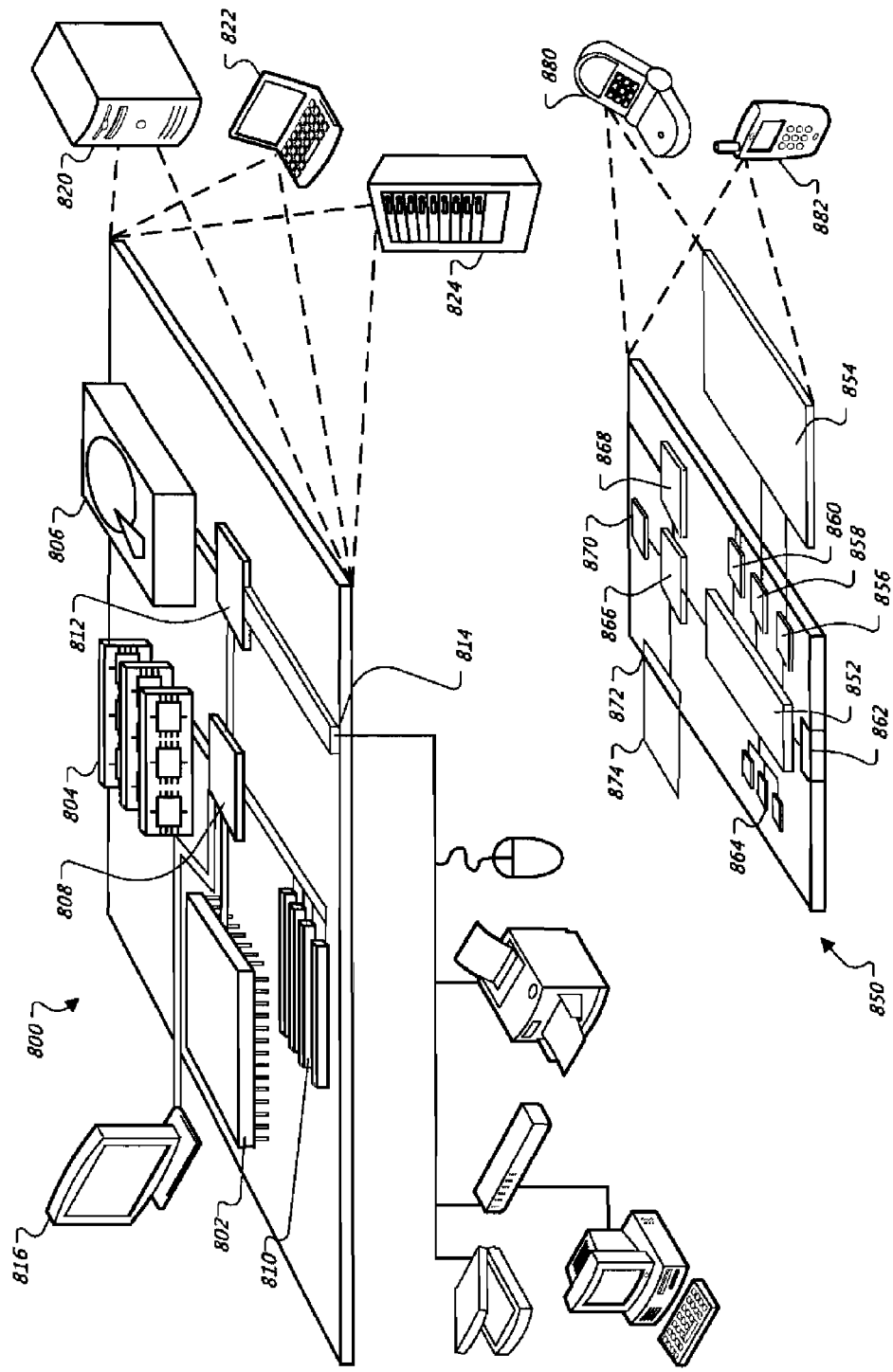
FIG. 8 shows an example of a computer device and a mobile computer device that can be used to implement the techniques described here.

FIG. 8 shows an example of a computer device 800 and a mobile computer device 850 that can be used to implement the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units.

In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, container document 102MA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ad servers ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the data extraction systems and methods have been described, it should be recognized that numerous other applications are contemplated. Moreover, although many of the embodiments have been described in relation to manual technician-led content selection followed by particular table or model comparison techniques, other data extraction methods may also be provided in other various forms. Accordingly, other embodiments are within the scope of the following claims.

What is claimed is:
1. A computer-implemented data analysis method, the method comprising:
   for each group of web pages:
      assigning one or more labels to one or more nodes in object models of respective web pages to provide multiple annotated object models;
      comparing multiple annotated object models; and
      determining that data from the respective web pages should be stored in a single database, and, in response, forming a composite object model, the composite object model being based on the multiple annotated object models and reflecting a structure of the respective web pages as a group;
   identifying an un-annotated web page;
   conducting an initial analysis of the un-annotated web page and, based on the initial analysis, identifying the un-annotated web page as a candidate for comparison;
   in response to the identifying of the un-annotated web page as the candidate for the comparison, comparing an object model of the un-annotated web page to each of the composite object models by calculating an edit distance between the object model of the un-annotated webpage and each of the composite object models;
   determining that a particular composite object model of the composite object models matches the object model based on the edit distance between the particular composite object model and the object model, and in response to the determining that the particular composite object model matches the object model, extracting, from the un-annotated web page, data associated with nodes in the object model that match labeled nodes in the particular composite object model and labeling nodes of the object model of the un-annotated web page based on the labeled nodes of the particular composite object model; and
   providing the extracted data for storage in a structured database in a manner associated with the labels.

2. The method of claim 1, wherein assigning one or more labels comprises manually selecting elements on each of the web pages and manually selecting labels for the selected elements.

3. The method of claim 1, wherein fields in the structured database correspond to the labels.

4. The method of claim 1, wherein each of the object models is provided as a template tree that includes single nodes that comprise repeated or optional data structures from the respective web pages.

5. The method of claim 4, wherein the object models of the web pages comprise Document Object Model (DOM) models.

6. The method of claim 1, further comprising accessing the structured database in response to a search request, and providing one or more search results that include hyperlinks to web pages associated with data in the structured database that is responsive to the search request.

7. The method of claim 1, further comprising identifying the un-annotated web page by crawling a plurality of web pages at a domain corresponding to one of the respective web pages.

8. A computer-implemented system for extracting data from electronic documents, the system comprising:
  one or more processors;
  a computer-readable storage medium coupled to the one or more processors and having instructions stored thereon, which, when executed by the one or more processors, provide:
    a template generator to create object models of network-accessible documents;
    a template labeler to, for each group of network-accessible documents, categorize elements in object models of the network-accessible documents, object models of the network-accessible documents being compared and, a composite object model being formed based on the object models in response to determining that the object models match;
    a template comparison module to determine levels of match between a composite labeled template, representative of the composite object model, and unlabeled templates of network-accessible documents;
    a document object model (DOM) analyzer to conduct an initial analysis of a network-accessible document and to, based on the initial analysis, identify the network-accessible document as a candidate for comparison, wherein, in response to the identifying of the network-accessible document as the candidate for the comparison, the template comparison module compares a template of the network-accessible document to each of the composite labeled templates by calculating an edit distance between the template of the network-accessible document and each of the composite labeled templates and determines that a particular composite labeled template of the composite object models matches the template of the network-accessible document based on the edit distance between the particular composite labeled template and the template of the network-accessible document, the template labeler labeling the template of the network-accessible document based on labels of the composite labeled template in response to determining that the template of the network-accessible document and the particular composite labeled template match; and
    a data extractor that, in response to the determining that the composite labeled template matches the template of the network-accessible document, extracts data from the network-accessible document at locations corresponding to labeled elements in the composite labeled template, and stores the extracted data in a structured database.

9. The system of claim 8, further comprising a crawler to identify pages at a domain corresponding to pages having labeled templates.

10. The system of claim 8, further comprising a search engine programmed to search the structured database in response to a search request, and to generate search results that include links to network-accessible documents associated with data entries in the structured database.

11. The system of claim 8, wherein the template labeler is programmed to receive manual user labeling of document elements and to match the user labeling to elements in the object models.

12. The system of claim 8, wherein the object models created by the template generator include single nodes that comprise repeated or optional data structures from the respective network-accessible documents.

13. The system of claim 8, wherein the template comparison module comprises a finite-state transducer.

14. A system for extracting data from electronic documents, the system comprising:
  one or more processors;
  a computer-readable storage medium coupled to the one or more processors and having instructions stored thereon, which, when executed by the one or more processors, provide:
    a template generator to create object models of network-accessible documents;
    a template labeler to, for each group of network-accessible documents, categorize elements in object models of the network-accessible documents, object models of the network-accessible documents being compared and a composite object model being formed based on the object models in response to determining that the object models match;
    means for comparing document templates to determine a degree of match between a composite labeled template, representative of the composite object model, and unlabeled templates of network-accessible documents;
    a document object model (DOM) analyzer to conduct an initial analysis of a network-accessible document and to, based on the initial analysis, identify the network-accessible document as a candidate for comparison, wherein, in response to the identifying of the network-accessible document as the candidate for the comparison, the template comparison module compares a template of the network-accessible document to each of the composite labeled templates by calculating an edit distance between the template of the network-accessible document and each of the composite labeled templates and determines that a particular composite labeled template of the composite object models matches the template of the network-accessible document based on the edit distance between the particular composite labeled template and the template of the network-accessible document, the template labeler labeling the template of the network-accessible document based on labels of the composite labeled template in response to determining that the template of the network-accessible document and the particular composite labeled template match; and
    a data extractor that, in response to the determining that the composite labeled template matches the template of the network-accessible document, extracts data from the network-accessible document, at locations associated with labels in the composite labeled template.

15. A computer-implemented data analysis method, the method comprising:
  for each group of web pages:
    forming a composite object model based on object models corresponding to a plurality of web pages of the group;

assigning one or more labels to one or more nodes in the composite object model;

conducting an initial analysis of an un-annotated web page and, based on the initial analysis, identifying the un-annotated web page as a candidate for comparison;

in response to the identifying of the un-annotated web page as the candidate for the comparison, comparing an object model of the un-annotated web page to each of the composite object models by calculating an edit-distance between the object model of the un-annotated web page and each of the composite object models;

determining that a particular composite object model of the composite object models matches the object model based on the edit distance between the particular composite object model and the object model, and in response to the determining that the particular composite object model matches the object model, extracting, from the un-annotated web page, data associated with nodes in the object model that match labeled nodes in the particular composite object model and labeling nodes of the object model of the un-annotated web page based on the labeled nodes of the particular composite object model; and providing the extracted data for storage in a structured database in a manner associated with the labels.

* * * * *